United States Patent [19]

Mansfield

[11] Patent Number: 4,682,994
[45] Date of Patent: Jul. 28, 1987

[54] PROCESS AND APPARATUS FOR FORMING OPTICAL FIBER PREFORM

[75] Inventor: Robert J. Mansfield, Stow, Mass.

[73] Assignee: Polaroid Corporation, Cambridge, Mass.

[21] Appl. No.: 809,018

[22] Filed: Dec. 16, 1985

[51] Int. Cl.$^4$ ................... C03B 19/06; C03B 37/027
[52] U.S. Cl. ........................... 65/3.12; 65/18.2; 427/163
[58] Field of Search ............ 65/2, 3.11, 3.12, 18.2; 428/163

[56] References Cited

U.S. PATENT DOCUMENTS

| | | | |
|---|---|---|---|
| 3,428,519 | 2/1969 | Zvanut | 161/181 |
| 3,775,075 | 11/1973 | Keck et al. | 65/3 |
| 4,062,665 | 12/1977 | Izawa et al. | 65/18.2 X |
| 4,263,032 | 4/1981 | Sinclair et al. | 65/3.12 |
| 4,295,870 | 10/1981 | Schneider et al. | 65/3.12 |
| 4,302,230 | 11/1981 | Macchesney et al. | 65/3.12 |
| 4,363,647 | 12/1982 | Bachman et al. | 65/18.2 |

FOREIGN PATENT DOCUMENTS

| | | | |
|---|---|---|---|
| 0154342 | 11/1985 | European Pat. Off. | 65/3.12 |
| 3327484 | 2/1985 | Fed. Rep. of Germany | 65/3.12 |

*Primary Examiner*—Robert Lindsay
*Attorney, Agent, or Firm*—Francis J. Caufield

[57] ABSTRACT

An improved method for forming optical fiber preforms by the chemical vapor deposition technique utilizes an elongated burner having an array of burner orifices that forms an elongated silica particle stream having a thickness generally related to the diameter dimensions of a cylindrical preform starter rod. The burner can be formed as an elongated plate having the array of gas ports that produce the desired or silica stream. As a consequence, high initial silica particle deposition rates are obtained compared to prior methods utilizing circular burners, with the high initial deposition rates maintained throughout preform fabrication to result in an increase in preform production rates with an accompanying reduction in costs.

6 Claims, 2 Drawing Figures

PROCESS AND APPARATUS FOR FORMING OPTICAL FIBER PREFORM

BACKGROUND OF THE INVENTION

The present invention relates to optical fiber waveguides. More particularly, it concerns a method for fabricating optical fiber preforms from which optical fibers can be drawn and apparatus for accomplishing the method.

Optical fibers are typically fabricated from a high-purity silica and have a light transmitting core surrounded by a cladding layer. The indices of refraction of the core and the cladding are adjusted during manufacture to provide the cladding with an index of refraction that is less than that of the core to enable guided light transmission in the core. The finished fiber is typically drawn from a silica starting preform that has the same cross-sectional geometry of the finished fiber, but a diameter several orders of magnitude greater than that of the fiber. In drawing a fiber, one end of the preform is heated in a furnace and the fiber drawn in one or more drawing steps.

Various methods and variations thereof have been developed for fabricating preforms. In one method, known as the outside vapor deposition (OVD) process, silicon tetrachloride, oxygen, and hydrogen are combined in a burner nozzle and reacted in a flame at a temperature between 1400° and 1800° C. The hydrogen functions as a fuel with the silicon tetrachloride and the oxygen reacting to form high purity silica particles. The index of refraction of the resulting silica can be controlled by adding various dopants to the starting gases, for example, boron or fluorine compounds can be added to effect a lowering of the index of refraction while compounds of phosphorous or germanium can be added to effect an increase in the index of refraction.

The silica particles formed as a consequence of the reaction are deposited onto a suitable substrate that often times takes the form of an elongated cylindrical rod having a nominal starting diameter (e.g., <12 mm). In order to form a uniform deposit of the silica particles, it is common to rotate the substrate as well as move the depositing flame and the substrate axially relative to one another. A more sophisticated variation of this process employs a circular burner, having a diameter between two and four inches, with concentric rings of holes or slots through which the reactant gases flow to provide a generally cylindrical stream of silica particles. When a circular burner is used with a nominal diameter cylindrical starting rod, the initially presented surface area of the rod represents a relatively small target upon which the silica particles can be deposited. As a result, the deposition rate during the initial stage of preform fabrication is quite low (e.g., <0.5 gm/min) with a relatively large portion of the silica particles being formed by the circular burner not reaching their intended target surface. As the preform slowly increases in size with continued deposition, the surface area presented for receiving the silica particles increases to permit an increase in the deposition rate. With increased preform growth allowing for higher deposition rates, the deposition process accelerates until the desired preform diameter is attained, at which time the deposition rate can be several grams/minute. Since the burner must be large enough in diameter to accommodate the gas flow rates, the slow initial deposition rates can be regarded as a necessary, though not particularly efficient, incident to the use of circular burners. As can be appreciated, a need arises for overcoming the initial slow deposition rates associated with the use of circular burners as well as generally increasing the overall deposition rate.

SUMMARY OF THE INVENTION

In view of the above, the present invention provides an improved method and apparatus for forming optical fiber preforms in which uniformly high silica deposition of rates are achieved. The gaseous starting materials are directed through a rectangular burner having a foraminous or slotted burner configuration which produces a flame or reaction stream elongated in the direction of the rotatable starting substrate and having a width related to the diameter of the substrate to result in a stream of silica particles being directed towards a substrate in which the cross-sectional area of the stream is in the order of the initially presented target surface area of the substrate. As a result, the substrate presents a receiving surface to the silica stream that is reasonably matched in terms of area so that initial deposition rates are high compared to deposition rates using prior circular burners and in which substantially all of the silica particles produced as a consequence of the reaction are directed toward the substrate target surface. Additionally, the deposition rates remain high throughout the entire preform fabrication process. A silica stream having the desired configuration can be obtained by passing the silica precurser gases through a burner having an elongated array of flame ports substantially coextensive in width with the diameter of the starting substrate.

A principal objective of the present invention is, therefore, the provision of an improved method and apparatus for efficiently forming optical fiber preforms. Other objects and further scope of applicability of the present invention will become apparent from the detailed desciption to follow, taken in conjunction with the accompanying drawings, in which like parts are designated by like reference characters.

DESCRIPTION OF THE PREFERRED EMBODIMENT

Figure 1:
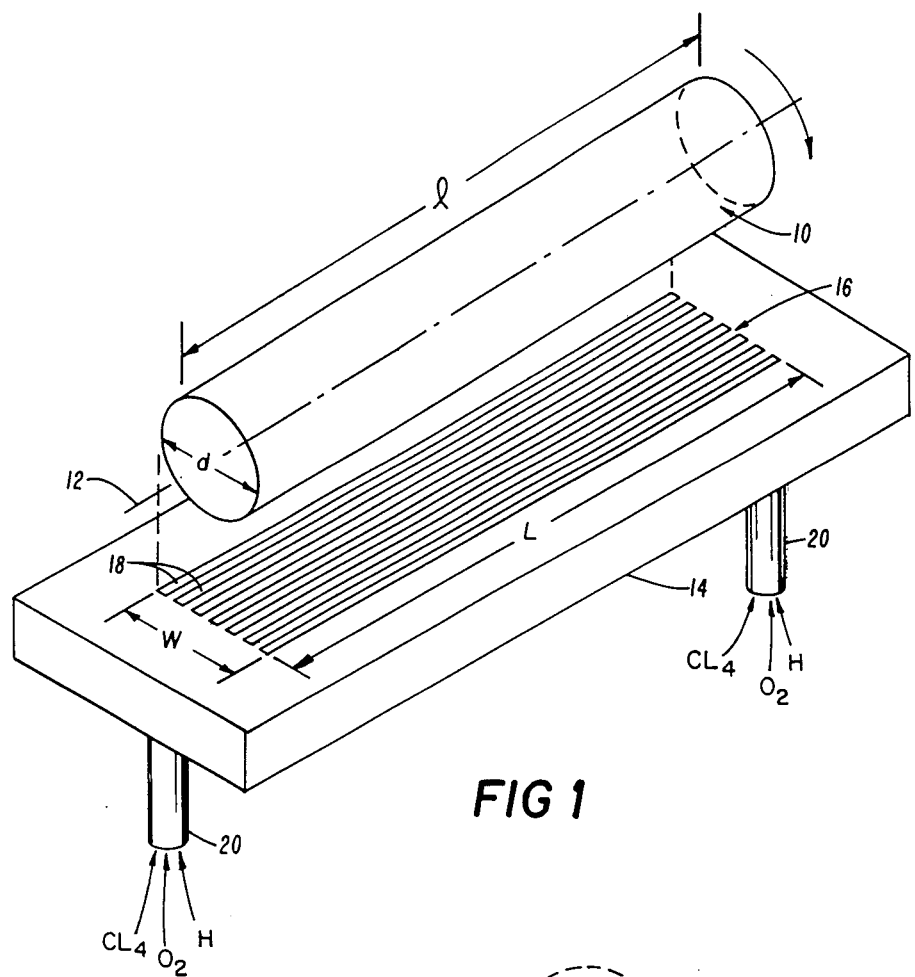
FIG. 1 is a perspective view of an apparatus for forming optical fiber preforms in accordance with the present invention.
Figure 2:
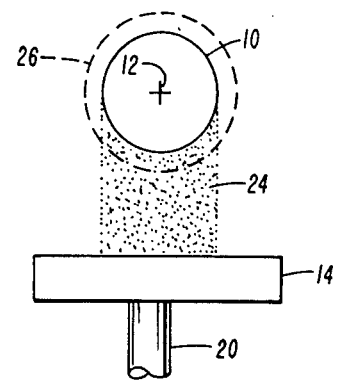
FIG. 2 is an end elevation of the apparatus illustrated in FIG. 1.

In accordance with the present invention, an optical fiber preform is fabricated by the chemical vapor deposition technique using an arrangement schematically illustrated in FIGS. 1 and 2. As shown therein, a generally cylindrical start rod or substrate 10 is maintained for rotation about a principal axis 12 by a support device (not shown), which can take the form of a glass lathe. The substrate 10 has selected diameter "d" and length "l" dimensions and is preferably fabricated from a silica material or a silica compatible material with surface characteristics that accept silica particles formed by chemical vapor deposition.

A burner 14 is spaced from the mandrel 10 and includes an array 16 of burner orifices or slots 18, arranged longitudinally in burner 14. The array 16 of slots 18 has width and length dimensions "W" and "L", for providing a particle stream of generally such dimensions. For efficient deposition, the width of the array is in the order of the substrate diameter, and the length is many times the width to provide an adequate stream not exceeding the length of the substrate. The total number of slots 18, their individual cross-sections, and their spacing is not particularly critical, although the entire array 16 must generate a particulate soot stream of extended length having a width with uniform characteristics throughout the stream. While individual slots 18 are preferred, the array may take the form of a foraminous array of elongated or circular holes.

The burner 14 includes a pair of entry conduits 20 at each end of the burner through which the silica precursor gases, viz., silicon tetrachloride, oxygen, hydrogen, are introduced by connection to appropriate precursor gas supplies. Index of refraction altering dopants can be added to the precursor gas supply to alter the index of refraction of the resulting silica. For example, boron and fluorine compounds can be added to effect a lowering of the index of refraction while compounds of phosphorous or germanium can be added to effect an increase in the index of refraction. Consistent with this end, approriate baffling and manifolds (not shown) may be provided within the burner 14 to maintain the homogeneous mixture. With the homogeneous mixture of gases exiting the various slots 18 in the burner 14, the hydrogen functions as a combustible fuel to heat the mixture to a temperature of 1400° to 1800° C. where the silica tetrachloride is oxidized in the presence of the dopants, if any, to form particulate silica reaction products.

The substrate 10 is rotated about the axis 12 as the silica particles, indicated generally in FIG. 2 by the reference character 24, are directed to and deposited onto the surface of the substrate where they accumulate to increase the overall diameter as indicated at 26. Since the length of the array will generally be shorter than the substrates, which range up to a meter in length, relative motion between the substrate and array are provided by moving the array back and forth along the substrate. As the thickness of the silica accumulations increases, the percentage concentration of any dopants introduced into the precursor gases can be varied to vary the optical characteristics of the deposited silica.

The deposition of the particulate silica can be continued until a desired layer thickness is achieved. Thereafter, the substrate 10 can be removed from the glass forming lathe and the resulting silica particle accumulation consolidated to form an optical fiber preform.

As can be appreciated from the above, the use of a particulate silica stream having an extensive length and preferably a width dimension in order of the diameter of the mandrel permits high initial silica deposition rates that are maintained throughout the preform fabricating process in contrast to the prior use of circular burners in which silica deposition rates were initially very small. The overall deposition rate is increased over prior processes utilizing a circular burner to result in increased preform production rates at reduced cost.

The length of the array 16 may be made approximately equal to the length of the substrate 10; however, for gas feed considerations, etc., shorter lengths are utilized, and it should be understood that considerable burner efficiency is still achieved so long as the length of the array is large as compared to its width. Preferably, the length of the array is more than twenty times its width. Where the length of the burner is not equal to the substrate's length, relative movement is provided to coat the full length of the substrate.

As a specific example, a burner 10 mm wide and 10 cm long is employed for coating a 10 cm long start rod of 5 mm to 10 mm initial diameter to the final diameter of 10 cm.

Thus, it will be appreciated from the above that as a result of the present invention, a highly effective method for forming an optical fiber preform and apparatus therefor is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims.

What is claimed is:

1. A method for fabricating elongated optical fiber preforms, comprising the steps of:
   supporting an elongated cylindrical substrate member for rotation about the longitudinal axis thereof, the substrate member having a length dimension and an exterior diameter dimension; and
   forming and directing a homogeneous stream of silica precursor gases and a fuel gas towards the exterior of said substrate member, the fuel gas heating the precursor gases to a temperature range sufficient to effect reaction of the precursor gases to form a stream of silica particles, the stream of silica particles having approximately the same width as the exterior diameter of the substrate member and a length many times greater than its width.

2. The method of claim 1 wherein the length of said stream is approximately the same as the length of the substrate member.

3. An apparatus for fabricating optical fiber preforms comprising:
   means for supporting a cylindrical substrate member having a length dimension and an external width dimension for rotation about the longitudinal axis of said rod;
   means for forming a homogeneous mixture of silica precursor gases and a fuel gas and for directing a stream of silica particles resulting from said mixture toward the exterior of said substrate member, the stream having a width dimension approximately the same as the width of said substrate and a length many times greater than its width.

4. The apparatus of claim 3 wherein the length of said stream is approximately the same as the length of said substrate.

5. The apparatus of claim 4, wherein said second-mentioned means comprises means defining a burner having an array of orifices, said array having a length and width dimension approximately the same as that of said substrate.

6. The apparatus of claim 5 wherein said orifices are defined as elongated slots.

* * * * *